Nov. 17, 1953 — M. E. STORER — 2,659,235
EXPLOSIVE ATMOSPHERE TEST CHAMBER
Filed Feb. 16, 1952
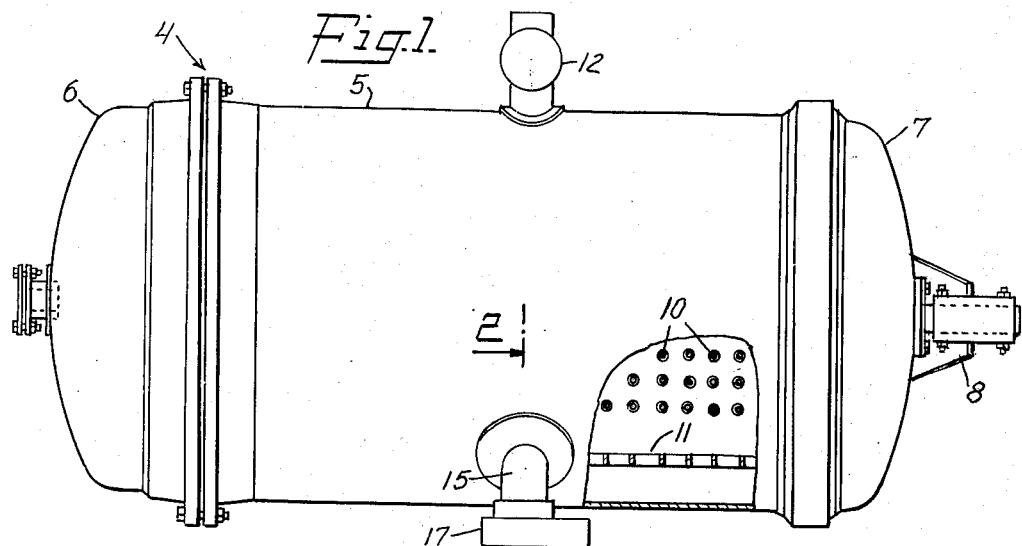
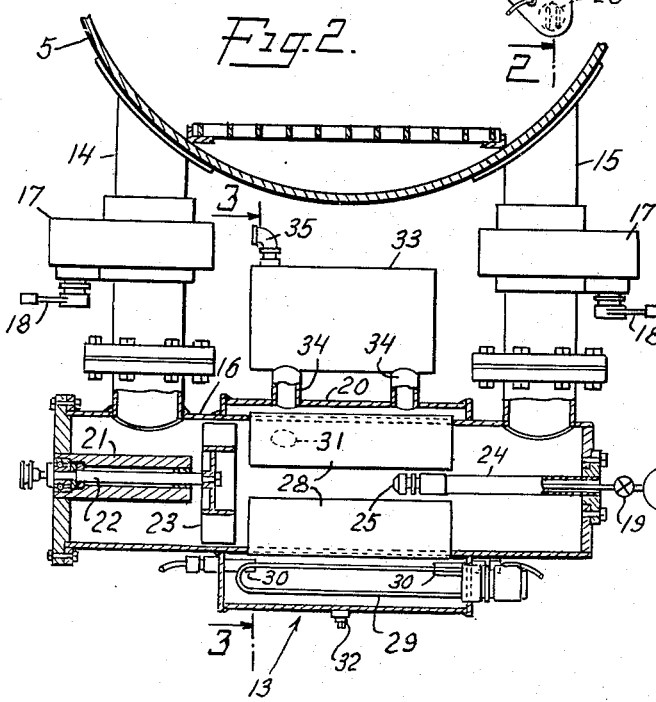
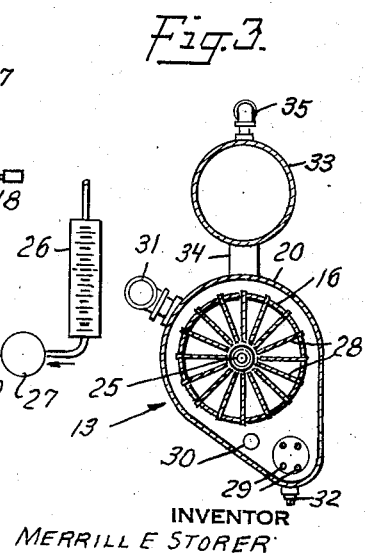
INVENTOR
MERRILL E. STORER
BY
ATTORNEYS Patented Nov. 17, 1953

2,659,235

UNITED STATES PATENT OFFICE 2,659,235

EXPLOSIVE ATMOSPHERE TEST CHAMBER

Merrill E. Storer, Rochelle Park, N. J., assignor to Janke and Company, Hackensack, N. J., a corporation of New Jersey Application February 16, 1952, Serial No. 271,907

7 Claims. (Cl. 73—432)

This invention relates to explosion-proof testing devices and, more particularly, to apparatus for establishing an explosive atmosphere within an explosion-proof test chamber.

It has become standard procedure to test in a controlled explosive atmosphere the operation of control apparatus and other components designed for use in aircraft. Such control apparatus includes electric motors and generators, electric cutouts and contactors, electronic devices and the components thereof, mechanical devices and hydraulic apparatus, in short, any control device or component the operation of which, whether because of its electrical, percussive or frictional characteristics, might create a spark or generate heat which could ignite an explosive atmosphere. Inasmuch as there is always the possibility of the development within a portion of an aircraft structure of an explosive mixture of gasoline vapor and air, it is important to establish before actual use of a specific type of aircraft control apparatus or other component the fact that it will not ignite such an explosive mixture when operated. For this purpose, the apparatus to be tested is placed within an explosion-proof test chamber within which the apparatus can be operated while maintaining about and with the apparatus itself an ambient explosive atmosphere. Thorough testing of the apparatus requires assurance as to the composition of the atmosphere established within the test chamber, that is, that the composition of the test atmosphere be the most explosive which might be encountered in service, and such assurance can be realized only if a measured amount of the combustible liquid is completely vaporized and uniformly mixed with the combustion-supporting gas within the test chamber.

The apparatus of the present invention is particularly adapted to establish within an explosion-proof test chamber a uniform atmosphere composed of an explosive mixture of accurately controlled composition comprising the vapor of a combustible liquid and a combustion-supporting gas. The apparatus of the invention includes the test chamber, a vaporizing chamber, two conduits communicating between spaced portions of the test chamber and of the vaporizing chamber, and circulating means for circulating the combustion-supporting gas through a closed path including the vaporizing chamber, one of said conduits, the test chamber and the other conduit back to the vaporizing chamber. Liquid injection means is provided for injecting a spray of the liquid into the circulating stream of combustion-supporting gas, and a plurality of heat exchange elements are provided which project into the interior of the vaporizing chamber where they are adapted to impart vaporizing heat for the liquid injected into the stream of gas flowing through the vaporizing chamber.

These and other novel features of the apparatus of the invention will be more readily understood by reference to the accompanying drawings in which Fig. 1 is a side elevation of a test chamber embodying the vaporizing device of the invention;

Fig. 2 is a partial sectional elevation taken along line 2—2 in Fig. 1; and

Fig. 3 is a sectional view taken along line 3—3 in Fig. 2.

A representative explosion-proof test chamber 4 is shown in Fig. 1. The chamber comprises a cylindrical body portion 5, a fixed but advantageously removable end closure portion 6 and another end closure portion 7 removably positioned adjacent the other end of the chamber, the movable end closure being mounted on a hinged arm member 8. The interior of the chamber 4 is provided with electrical, hydraulic and mechanical connections 10 for the apparatus to be tested within the chamber, and there is further provided a test rack 11 for supporting the apparatus during its test. An explosion relief valve 12 such, for example, as that shown and described in the application of George J. Diebold, Serial No. 271,906, filed concurrently herewith, is provided adjacent the upper portion of the test chamber 4, and the lower portion of the chamber is provided with a vaporizing device 13 embodying the present invention.

The vaporizing device 13, as shown in Fig. 2, includes two conduits 14 and 15 communicating between spaced portions of the test chamber 4 and a vaporizing chamber 16. The conduits 14 and 15 are provided with suitable valves 17 which, when open, permit circulation of a gas stream between the test chamber 4 and the vaporizing chamber 16 and which, when closed, provide an explosion-proof seal for the test chamber atmosphere. Such valves may comprise with advantage conventional double disc valves and may be operated either manually, mechanically, electrically or hydraulically through the control lever 18 associated with each valve. The lower ends of the conduits 14 and 15 on the side of the valves 17 remote with respect to the test chamber communicate with the vaporizing chamber 16 adjacent opposite ends thereof.

The vaporizing chamber comprises a substantially cylindrical shell the central portion of which is enclosed in a water jacket 20. One end portion of the vaporizing chamber is closed with a sleeve gland assembly 21 which supports a power driven shaft 22 carrying on its inner end an axial-flow fan 23. The fan is so driven as to effect circulation of a combustion-supporting gas such as air toward the opposite end of the vaporizing chamber in which there is mounted a liquid injection device 24.

The liquid injection device comprises a conventional spray nozzle 25 to which the liquid to be vaporized (such as gasoline) is delivered under pressure from a measuring vessel 26 through a pump 27. It will be noted that the spray of gasoline is directed into the vaporizing chamber countercurrently to the flow of air maintained by the fan 23. After a predetermined and measured amount of the liquid to be vaporized is supplied to the vaporizer through the nozzle 25, a valve 19 in the liquid supply line is closed to seal off the liquid supply. Thus, the measured quantity of liquid supplied to the system comprising the vaporizing chamber 16, the test chamber 4 and the conduits 14 and 15 is completely retained within this system wherein it is ultimately completely vaporized.

Complete vaporization of the liquid injected into the system by the nozzle 25 is insured by the provision of heat exchange fins 28 which extend radially inwardly into the vaporizing chamber from the outer wall of the vaporizing chamber shell. The fins 28 supply heat to the atomized liquid through the medium of the combustion-supporting gas fins which pass over the fins in the course of the circulation effected by the fan 23. The heat contributed to the gas by the fins 28 is supplied by conduction from a body of hot water filling the water jacket 20 surrounding the vaporizing chamber. Heat is supplied to this body of water by suitable heating elements such, for example, as electrical resistance elements 29. Operation of the heating elements may be controlled advantageously by thermostatic elements 30 extending into the body of water. The water jacket is advantageously further provided with a water inlet 31, a drain outlet 32, and an expansion tank 33 communicating with the jacket 20 through conduits 34. The expansion tank may in turn be provided with a relief outlet 35.

Operation of the vaporizing device of the invention for establishing in the test chamber 4 a uniform explosive atmosphere is initiated by opening the valves 17 and starting the circulating fan 23. Inasmuch as the fan merely circulates the combustion-supporting gas such as air present in the closed system comprising the test chamber, the vaporizing chamber and the conduits 14 and 15, the amount of air available for admixture with the liquid to be vaporized can be readily ascertained. Accordingly, by injecting a measured amount of the liquid to be vaporized from the measuring device 26 into the vaporizing chamber 16, there will be present in the aforementioned closed circuit the specific amounts of combustible and combustion-supporting components required to produce any desired explosive mixture. Thus, while circulation of the test chamber atmosphere through the vaporizing chamber 16 is maintained by the fan 23, the measured quantity of the liquid to be vaporized is injected through the nozzle 25. The atomized particles of the liquid are then carried in the stream until they are completely vaporized. Vaporization of the atomized liquid is insured by heating of the combustion-supporting gas by the fins 28 which establish heat exchange conditions between the hot water surrounding the vaporizing chamber and the gaseous atmosphere within the vaporizing chamber. The effectiveness of the resulting continued circulation and controlled heating of the circulating atmosphere makes it possible to establish completely uniform conditions composed of any desired explosive proportions of say gasoline and air within a maximum period of three minutes. Such rapid attainment of predetermined atmospheric conditions within the test chamber is particularly conducive to the effective use of the test chamber. Thus, within a matter of only a few minutes after initiating operation of the vaporizing device of the invention, this operation is discontinued and the valves 17 are closed to place the test chamber 4 in readiness for the desired testing of an electrical device therewithin.

I claim:

1. Apparatus for establishing in an explosion-proof test chamber a uniform atmosphere composed of an explosive mixture of the vapor of a combustible liquid and a combustion-supporting gas which comprises said test chamber, a vaporizing chamber, two conduits communicating between spaced portions of the test chamber and of the vaporizing chamber, circulating means for circulating the combustion-supporting gas through a closed path including (a) the vaporizing chamber, (b) one of said conduits, (c) the test chamber and (d) the other conduit back to the vaporizing chamber, liquid injection means for injecting a spray of the liquid into the circulating stream of combustion-supporting gas, and a plurality of heat exchange elements projecting into the interior of the vaporizing chamber and adapted to impart vaporizing heat for the liquid injected into the stream of gas flowing through the vaporizing chamber.

2. Apparatus for establishing in an explosion-proof test chamber a uniform atmosphere composed of an explosive mixture of the vapor of a combustible liquid and a combustion-supporting gas which comprises said test chamber, a vaporizing chamber, two conduits communicating between spaced portions of the test chamber and of the vaporizing chamber, circulating means for circulating the combustion-supporting gas through a closed path including (a) the vaporizing chamber, (b) one of said conduits, (c) the test chamber and (d) the other conduit back to the vaporizing chamber, liquid injection means for injecting a spray of the liquid into the circulating stream of combustion-supporting gas, a heating jacket surrounding at least a portion of the vaporizing chamber, and a plurality of heat exchange elements projecting from the heating jacket into the interior of the vaporizing chamber and adapted to impart vaporizing heat for the liquid injected into the stream of gas flowing through the vaporizing chamber.

3. Apparatus for establishing in an explosion-proof test chamber a uniform atmosphere composed of an explosive mixture of the vapor of a combustible liquid and a combustion-supporting gas which comprises said test chamber, a vaporizing chamber, two conduits communicating between spaced portions of the test chamber and of the vaporizing chamber, circulating means for circulating the combustion-supporting gas through a closed path including (a) the vaporizing chamber, (b) one of said conduits, (c) the test chamber and (d) the other conduit back to the vaporizing chamber, liquid injection means for injecting a spray of the liquid into the circulating stream of combustion-supporting gas, a water jacket surrounding at least a portion of the vaporizing chamber, heating means for supplying heat to the water in said jacket, and a plurality of heat exchange fins projecting radially into the interior of the vaporizing chamber from the portion of the vaporizing chamber in contact with the water jacket and adapted to impart vaporizing heat for the liquid injected into the stream of gas flowing through the vaporizing chamber.

4. Apparatus for establishing in an explosion-proof test chamber a uniform atmosphere composed of an explosive mixture of the vapor of a combustible liquid and a combustion-supporting gas which comprises said test chamber, a vaporizing chamber, two conduits communicating between spacer portions of the test chamber and of the vaporizing chamber, a valve positioned in each of said conduits, circulating means for circulating the combustion-supporting gas through a closed path including (a) the vaporizing chamber, (b) one of said conduits, (c) the test chamber and (d) the other conduit back to the vaporizing chamber, liquid injection means for injecting a spray of the liquid into the circulating stream of combustion-supporting gas, and a plurality of heat exchange elements projecting into the interior of the vaporizing chamber and adapted to impart vaporizing heat for the liquid injected into the stream of gas flowing through the vaporizing chamber.

5. Apparatus for establishing in an explosion-proof test chamber a uniform atmosphere composed of an explosive mixture of the vapor of a combustible liquid and a combustion-supporting gas which comprises said test chamber, a vaporizing chamber, two conduits communicating between spaced portions of the test chamber and of the vaporizing chamber, circulating means for circulating the combustion-supporting gas through a closed path including (a) the vaporizing chamber, (b) one of said conduits, (c) the test chamber and (d) the other conduit back to the vaporizing chamber, liquid injection means for injecting a spray of the liquid countercurrently into the circulating stream of combustion-supporting gas, and a plurality of heat exchange elements projecting into the interior of the vaporizing chamber and adapted to impart vaporizing heat for the liquid injected into the stream of gas flowing through the vaporizing chamber.

6. Apparatus for establishing in an explosion-proof test chamber a uniform atmosphere composed of an explosive mixture of the vapor of a combustible liquid and a combustion-supporting gas which comprises said test chamber, a vaporizing chamber, two conduits communicating between spaced portions of the test chamber and of the vaporizing chamber, circulating means for circulating the combustion-supporting gas through a closed path including (a) the vaporizing chamber, (b) one of said conduits, (c) the test chamber and (d) of the other conduit back to the vaporizing chamber, liquid injection means for injecting a measured quantity of the liquid into the circulating stream of combustion-supporting gas, closure means for closing the liquid injection means after said measured quantity of the liquid has been injected and thus retaining the liquid within said closed path after its injection thereinto so as to insure its complete vaporization, and a plurality of heat exchange elements projecting into the interior of the vaporizing chamber and adapted to impart vaporizing heat for the liquid injected into the stream of gas flowing through the vaporizing chamber.

7. Apparatus for establishing in an explosion-proof test chamber a uniform atmosphere composed of an explosive mixture of the vapor of a combustible liquid and a combustion-supporting gas which comprises said test chamber, a vaporizing chamber, two conduits communicating between spaced portions of the test chamber and of the vaporizing chamber, a valve positioned in each of said conduits, circulating means for circulating the combustion-supporting gas through a closed path including (a) the vaporizing chamber, (b) one of said conduits, (c) the test chamber and (d) the other conduit back to the vaporizing chamber, liquid injection means for injecting a spray of the liquid into the circulating stream of combustion-supporting gas, closure means for closing the liquid injection means after said measured quantity of the liquid has been injected and thus retaining the liquid within said closed path after its injection thereinto so as to insure its complete vaporization, and a plurality of heat exchange elements projecting into the interior of the vaporizing chamber and adapted to impart vaporizing heat for the liquid injected into the stream of gas flowing through the vaporizing chamber.

MERRILL E. STORER.

References Cited in the file of this patent

UNITED STATES PATENTS

| Number | Name | Date |
| --- | --- | --- |
| 1,658,391 | Potter | Feb. 7, 1928 |
| 2,362,500 | Quenon | Nov. 14, 1944 |